April 14, 1959        K. E. JAMES        2,882,073
GASKET FOR BELL AND SPIGOT CONCRETE PIPE
Filed June 3, 1957        2 Sheets-Sheet 2
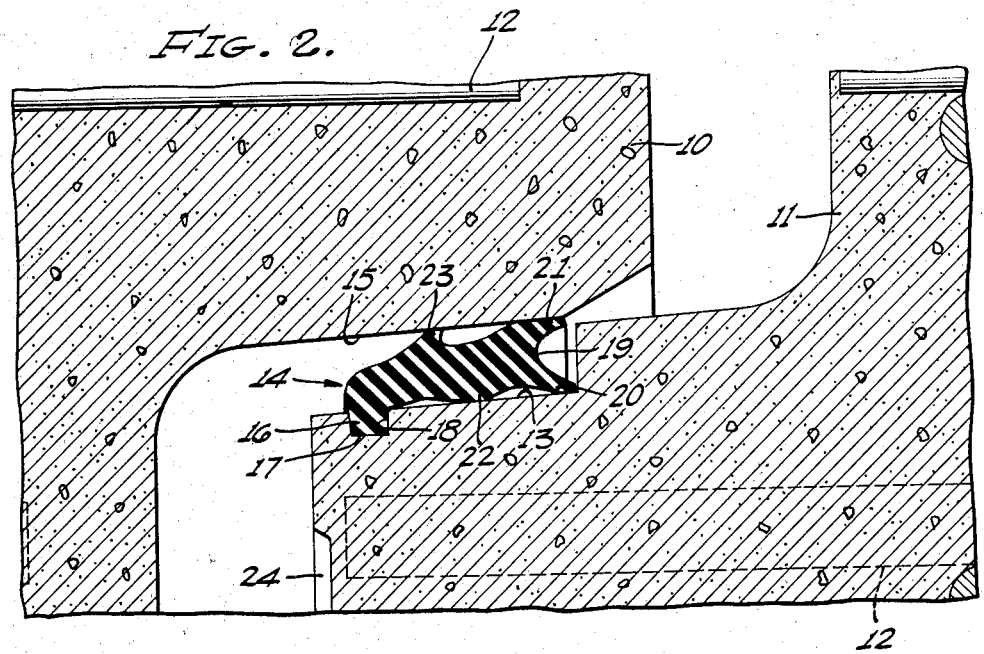
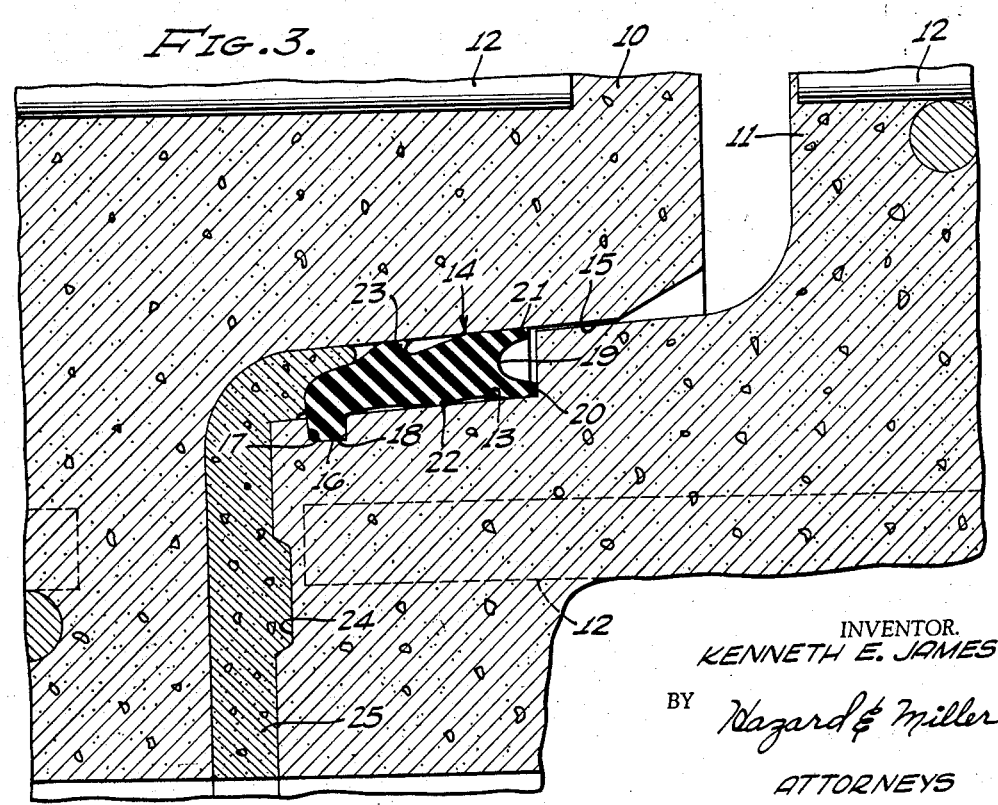
INVENTOR.
KENNETH E. JAMES
BY Hazard & Miller
ATTORNEYS

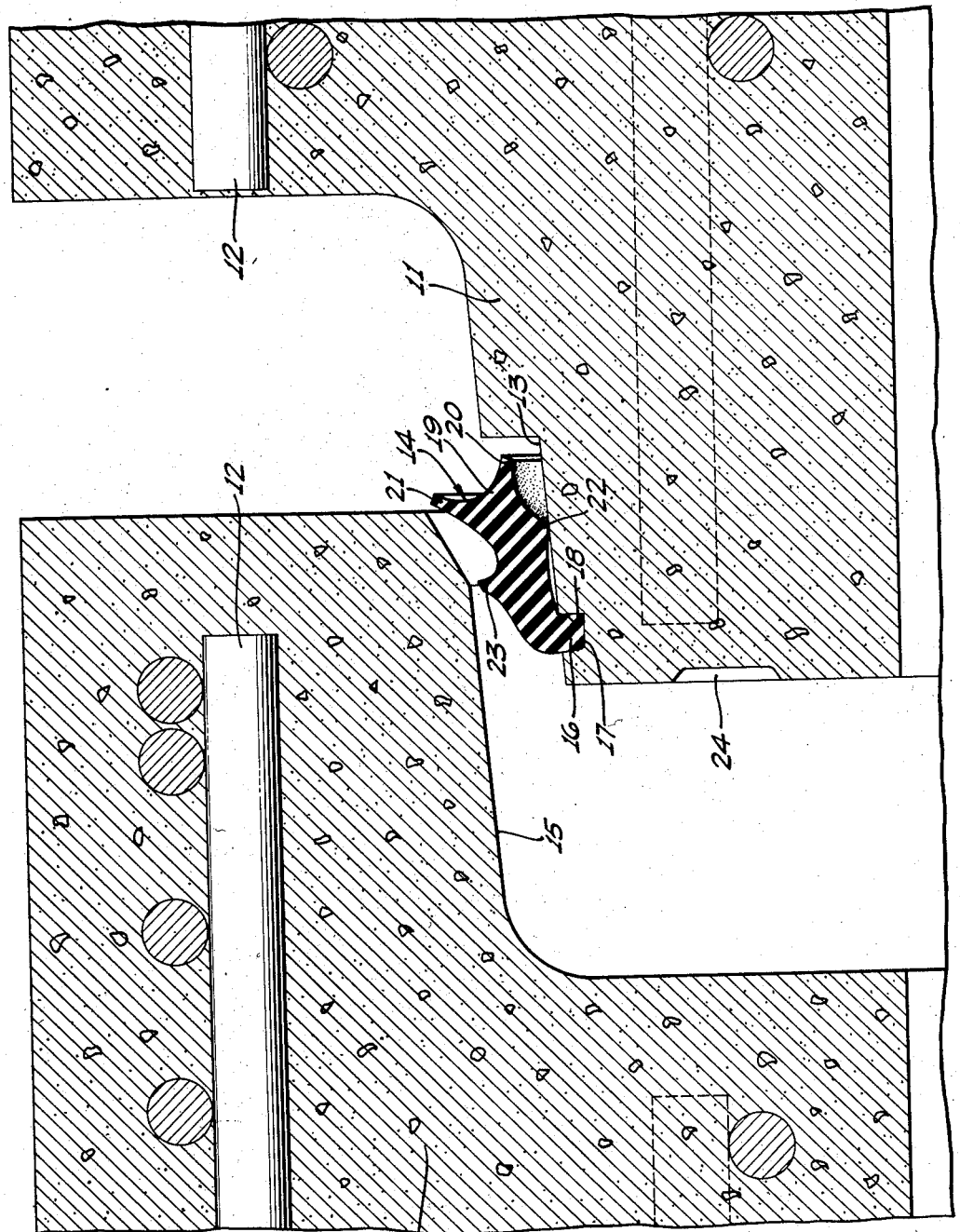

United States Patent Office 2,882,073
Patented Apr. 14, 1959

2,882,073

GASKET FOR BELL AND SPIGOT CONCRETE PIPE

Kenneth E. James, Baldwin Park, Calif., assignor to United Concrete Pipe Corporation, Baldwin Park, Calif., a corporation of California Application June 3, 1957, Serial No. 663,144

1 Claim. (Cl. 285—374)

This invention relates to an improved gasket or sealing ring for use between the spigot and bell of concrete pipe and to a bell and spigot joint wherein such gasket or sealing ring is used.

A primary object of the invention is to provide an improved gasket or sealing ring which is of relatively simple construction and which can be easily applied to the spigot end of a section of concrete pipe and when the spigot and bell are mutually assembled together, will remain in its applied position and form an effective seal, particularly against leakage from the exterior of the pipe through the joint.

Another object of the invention is to provide an improved bell and spigot joint wherein the improved sealing ring is used.

More specifically, an object of the invention is to provide a gasket or sealing ring for use between the spigot and bell of concrete pipe consisting of an endless rubber ring which is stretched onto the spigot and which has on the interior thereof, an annular rib or head so arranged that it can function somewhat as a fulcrum when in applied position to urge the rear portion of the ring to expand or flare outwardly into firm engagement with the interior of the bell. In the preferred form of construction, the rear face of the gasket is grooved to define two rather flexible rearwardly extending flanges which are engageable with the spigot and with the interior of the bell respectively, and which function to effectively seal against ingress of liquids external of the pipe. The flaring effect created by the fulcrum-forming rib assures that the flange which is engageable with the interior of the bell will exert adequate pressure against the bell to prevent ingress of such liquids.

With the foregoing and other objects in view which will be made manifest in the following detailed description, reference is had to the accompanying drawings for an illustrative embodiment of the invention wherein, Fig. 1 is a partial view in vertical section of one side of a bell and one side of a spigot illustrating the gasket embodying the present invention as having been applied to the spigot and illustrating the spigot in a position wherein it is about to be assembled with the bell.

Fig. 2 is a similar view illustrating the spigot in the process of being assembled with the bell.

Fig. 3 is a similar view but illustrating the joint as having been completed.

Referring to the accompanying drawings wherein similar reference characters designate similar parts throughout;

10 indicates generally the bell end of a section of reinforced concrete pipe and 11 indicates generally the spigot end of an adjoining section of concrete pipe. In conformity with conventional practice, this pipe may or may not be reinforced with metallic reinforcements indicated at 12. The spigot end is shown as having been externally reduced at 13 to provide an adequate space to accommodate the gasket or sealing ring 14 within the tapered internal surface 15 of the bell. The sealing ring 14 is in the nature of an extruded rubber strip having the cross sectional shape approximately that shown in Fig. 1. The ends of the strip are brought together and either rubber welded or cemented together so as to form an endless band or ring which is slightly smaller in diameter than the external diameter of the reduced end 13 of the spigot. This band, being slightly smaller than the end of the spigot, must be stretched slightly in order to slip it onto the spigot, and when in applied position, it is allowed to contract upon the spigot.

The band has an internal annular flange 16 at the forward end thereof which is receivable in an annular groove 17 formed on the end of the spigot so as to abut against a forwardly facing shoulder 18 formed by the rear side of the groove. This flange 16 being in abutment with the forwardly facing shoulder 18, tends to hold the gasket against slippage on the spigot while the spigot is being inserted into the bell. In some forms the inwardly extending flange 16 may abut against the forward end of the spigot or hang over the forward end of the spigot and accomplish the same result of resisting axial slippage during the insertion of the spigot. However, I prefer to employ the groove 17 and to have the groove filled by the flange 16 as illustrated.

From the flange 16 the ring may be regarded as thickening rearwardly and has on its rearward face an annular groove 19 defining inner and outer relatively resilient flanges 20 and 21. These flanges which extend rearwardly are relatively limber and are engageable with the spigot and with the interior of the bell, respectively. On the interior of the band or ring there is formed an annular rib or bead 22. This rib is located slightly to the rear of the geometrical center of the cross section of the gasket. It is engageable with the exterior of the spigot and considering that the gasket has been stretched in applying it to the spigot, this rib serves somewhat as a fulcrum tending to flare or expand that portion of the gasket disposed rearwardly of the rib outwardly into the approximate position illustrated in Fig. 1. In this position it will be noted that the outer end of flange 21 is disposed on a diameter considerably greater than the interior wall surface 15 of the bell. The inner flange 20 may even be spaced from the exterior of the spigot as illustrated.

On the outer side of the gasket or ring there may be formed an external rib 23 which, if employed, is disposed forwardly of the rib 22 and forwardly of the geometrical center of the cross section of the gasket. On the forward face of the spigot there is preferably formed an annular groove 24 and in some instances this groove may be formed on the opposed face of the bell.

When the gasket has been stretched and slipped onto the spigot and has been allowed to contract onto the spigot into the position shown in Fig. 1, the pipe is ready for assembly. As the spigot enters the bell the rear or flared portion of the band engages the interior wall surface 15 of the bell and is bent inwardly largely about the rib 22 as a center from the position shown in Fig. 1 into the position shown in Fig. 2. In this position it will be noted that the external rib 23 may be slightly compressed and that the flange 21 is bent rather severely so that the flange when the joint is completed, will bear against the interior of the bell with considerable pressure. When the joint is completely assembled, the inner flange 20 will be caused to bear against the spigot with considerable pressure. These two flanges bearing on the bell and spigot respectively with their respective pressures, form an effective seal against ingress of liquids external of the pipe.

During the insertion of the spigot into the bell the engagement between flange 16 and shoulder 18 prevents axial slipping or displacement of the gasket with relation to the spigot. The joint is completed by forcing grout 25 into the space between the end of the spigot and the opposed face of the bell and due to the presence of the groove 24 the grout enters the groove and is effectively locked in place between the bell and spigot so that it will not drop out even in the event that the grout should crack. The grout is forced into the joint to the gasket and the external rib 23 may function to keep the grout from entering the joint so far as to interfere with the flexibility of the outer rear flange 21. Consequently, this flange may always function properly to seal against the bell and prevent ingress of extraneous liquids.

In lieu of retaining the gasket on the spigot by allowing it to contract from a stretched condition onto the spigot the flange 16 may be glued or adhesively fastened to the spigot.

Frequently pipe lines made up of this type of pipe are tested prior to grouting by subjecting the pipeline to internal pressure rather than attempting to demonstrate leak resistance by external pressure testing. Under these circumstances where internal pressure testing is done it is important that the projections or ribs 22 and 23 be sufficiently compressed to create an effective seal. The improved gasket has been demonstrated to resist leakage when the internal testing pressure has been as high as 18 lbs. per square inch. The bending stresses existing in the gasket between the rib 22 and the lip 21 insures a joint that is leak-tight against external infiltration. Even though lips 20 may not be caused to touch the spigot or press against the spigot with any great force the bending stress in the gasket between lip 21 and the compressed rib 22 is such as to maintain an adequate seal against infiltration. This may have particular importance if the joint is pulled so as to secure curved alignment, that is, where the adjoining pipe sections are not coaxially arranged as in the case of making large gradual bends.

It will be appreciated that the improved gasket can be easily formed as an extruded strip and can be easily applied to the spigot, and when in applied position, it is effectively locked thereon so that it cannot be easily axially displaced. When in applied position, it forms a highly effective seal. While the gasket is described as formed of rubber, it will be appreciated that this term is used in its broad sense to include not only natural vulcanized rubber but other synthetic rubber-like materials possessing some degree of rubber-like elasticity.

Various changes may be made in the details of construction without departing from the spirit or scope of the invention as defined by the claim.

I claim:

A bell and spigot joint between sections of concrete pipe wherein the spigot has stretched thereon an endless rubber ring acting as a gasket between the bell and spigot, said ring having an inwardly extending flange at the forward end portion abutting a forwardly facing shoulder on said spigot and a single internal annular rib disposed rearwardly of the geometrical center of the cross section of the ring and serving as a fulcrum tending to expand the rear portion of the ring outwardly against the bell, the rear end portion of the ring having a groove therein defining rearwardly extending flanges at the inside and outside of the ring engageable with the spigot and bell, respectively, and a single external rib engaging the bell forwardly of the mentioned internal rib with the internal and external surfaces of said ring concave between each rib and each of the end portions, with the contact surfaces between said ribs and sections being positioned entirely opposite a concavity in the respective opposite ring surface.

References Cited in the file of this patent

UNITED STATES PATENTS

| 2,223,434 | Trickey | Dec. 3, 1940 |
| 2,259,940 | Nathan | Oct. 21, 1941 |
| 2,518,829 | Smith | Aug. 15, 1950 |
| 2,561,884 | Perrow | July 24, 1951 |
| 2,615,740 | Nathan | Oct. 28, 1952 |
| 2,692,155 | Gheen et al. | Oct. 19, 1954 |
| 2,809,853 | Nathan | Oct. 15, 1957 |
| 2,841,429 | McCuistion | July 1, 1958 |

FOREIGN PATENTS

| 268,303 | Great Britain | May 10, 1928 |
| 945,303 | France | Nov. 22, 1948 |